United States Patent [19]

Pain et al.

[11] Patent Number: 5,778,206
[45] Date of Patent: Jul. 7, 1998

[54] DEVICE FOR INTERFACING BETWEEN A REDUNDANT-ARCHITECTURE COMPUTER AND A MEANS OF COMMUNICATION

[75] Inventors: Isabelle Pain, Jouy En Josas; Pahice Toillon, Le Pecq; Gerard Colas, Versailles, all of France

[73] Assignee: Sextant Avionique, Villacoublay, France

[21] Appl. No.: 690,156

[22] Filed: Jul. 19, 1996

[30] Foreign Application Priority Data

Jul. 19, 1995 [FR] France ................................. 95 08845

[51] Int. Cl.⁶ .............................................. G06F 13/38
[52] U.S. Cl. ............................... 395/309; 395/182.09
[58] Field of Search .............................. 395/280, 306, 395/309, 182.04, 182.09, 183.07

[56] References Cited

U.S. PATENT DOCUMENTS

| | | | |
|---|---|---|---|
| 4,523,272 | 6/1985 | Fukunaga et al. | 364/200 |
| 4,543,627 | 9/1985 | Schwab | 364/200 |
| 5,226,152 | 7/1993 | Klug et al. | 395/575 |
| 5,491,787 | 2/1996 | Hashemi | 395/182.09 |
| 5,550,978 | 8/1996 | Takahashi et al. | 395/200.01 |
| 5,586,256 | 12/1996 | Thiel et al. | 395/200.03 |

FOREIGN PATENT DOCUMENTS

| | | |
|---|---|---|
| A-0 184 976 | 6/1986 | European Pat. Off. |
| A-33 28 405 | 2/1985 | Germany . |

*Primary Examiner*—Ayaz R. Sheikh
*Assistant Examiner*—Jigar Pancholi
*Attorney, Agent, or Firm*—Browdy and Neimark

[57] ABSTRACT

In order to connect a computer comprising plural redundant processors to at least one digital data transfer bus, the interfacing device embodying the invention comprises: a means for synchronizing and comparing the transmission and reception requests respectively transmitted by the processors, and for triggering processing of a request when the latter has been transmitted by all the processors, a means for transferring the data blocks to be transmitted or received between a controller of said bus and the respective working memories of the processors, and a means for triggering the transfer of a data block if the latter is simultaneously at the output of all the processors, from one of the working memories to said bus controller, with a view to transmission thereof on said bus.

14 Claims, 5 Drawing Sheets

DEVICE FOR INTERFACING BETWEEN A REDUNDANT-ARCHITECTURE COMPUTER AND A MEANS OF COMMUNICATION

BACKGROUND OF THE INVENTION

1. Field of the Invention

This invention relates to an interfacing device designed to connect a redundant-architecture computer and a means of communication such as a bus controller connected to at least one digital data transfer bus.

It applies notably, though not exclusively, to the computers taken on board aerodynes, which, due to the high level of reliability and security required, have a redundant architecture comprising several processors. Such computers are connected, via a bus controlling circuit, to a set of busses enabling them to communicate with the other items of electronic equipment on board the aerodyne.

2. Description of the Prior Art

In this type of application, there is the problem with the connection of the computer processor outputs to the bus controlling circuit. This problem can be solved by two types of solutions.

With solutions of the first type, each processor transmits messages on the bus independently of the other processors. As all the processors run the same applications, they draw up the same data and therefore transmit the same messages on the bus for the same addressees. The addressees must therefore receive all the supposedly identical messages, compare them with one another and reject them if they differ. These solutions thus imply an additional processing workload for the addressees and the bus controlling circuit, an additional workload for the bus, and additional costs if one controlling circuit and one bus are used per processor.

Moreover, the programmes run by the addressees, which must include checking of the messages received, will therefore depend on the hardware architecture of the transmitters. As a result, the solutions lack flexibility insofar as they restrict the upgrading capacity of the different computers.

With solutions of the second type, with two redundant processors, the data at output of the processors of the computer are compared with one another, one single message being transmitted on the bus when the data supplied by the processors are identical. This comparison operation is usually performed by each processor, though only one processor has access to transmit to the bus controlling circuit, whereas the other processor usually has the means to invalidate the bus controlling circuit in the event of a variance being detected, or can advise the addressees, by a parallel means, that the data transmitted on the bus are invalid.

These solutions therefore imply an additional processing workload for the transmitter processors. Furthermore, as only one processor has access to transmit to the controlling circuit, the programmes run by the processors of a same computer are different, thereby entailing additional costs.

OBJECT OF THE INVENTION

The main object of this invention is to remedy the preceding disadvantages.

SUMMARY OF THE INVENTION

Accordingly, there is provided an interfacing device designed to connect a computer comprising plural redundant processors, to a bus controller connected to at least one digital data transfer bus.

The interfacing device is characterized in that it comprises:

a means for synchronizing and comparing the data block transmission and reception requests respectively transmitted by the processors, and for triggering processing of a request when the latter has been transmitted by all the processors, a means for transferring the data blocks to be transmitted or received by the bus controller, between the bus controller and the respective working memories of the processors, and a means for comparing the data blocks to be transmitted respectively supplied by the processors, and for triggering the transfer of a data block if the latter is situated identically at the outputs of all the processors, from the working memory of one of the processors to the bus controller with a view to transmission thereof on the bus.

Thus, in a device that is distinct from the processors have been grouped together all the processor synchronization tasks, all data transfers between the processors and the bus controller, and all the integrity checks that must be performed every time data is transmitted or received by a set of redundant processors. Accordingly, the processors of the computer are completely unburdened of these tasks and the programmes run by the processors can thus be identical and independent of the architecture of the computer, and management of the redundancy becomes transparent from the programmes' point of view.

On the other hand, the interfacing device avoids the necessity of a very strict material coupling (processor cycle by processor cycle) between the processors.

According to a feature of the invention, the interfacing device further comprises a means for checking the integrity of each data block received by the controller, and if the data block received is integral, for validating transfer thereof towards the respective working memories of the processors.

By way of this arrangement, the processors are also unburdened of checking the integrity of the data received.

According to another feature of the invention, the interfacing device comprises a means for computing a signature on each data block transmitted by each processor and received, for comparing with one another the signatures of the blocks transmitted by each processor, for adding said signature to each data block to be transmitted, for comparing the signature computed on each block received with the signature contained in said block and computed by the transmitter of the block, and for working out a status word including the result of these comparisons and a check word generated and supplied by the bus controller, said status word being transmitted to all the processors.

Each processor can thus check that its transmission and reception requests have been properly executed.

Advantageously, the device embodying the invention is connected to a FIFO type memory in which are stored all the exceptions and interruptions transmitted by the bus controller, this memory being accessible on request transmitted by each processor.

Thus, the processings carried out by the processors are not interrupted by the bus controller, acquisition of exception and interruption contexts being performed on a deferred and regular basis in relation to the processing. This is particularly advantageous in the case of certain critical functions which must have a deterministic temporal behavior.

BRIEF DESCRIPTION OF THE DRAWINGS

Further features and advantages of the invention will be apparent from an embodiment of the device according to the

Figure 1:
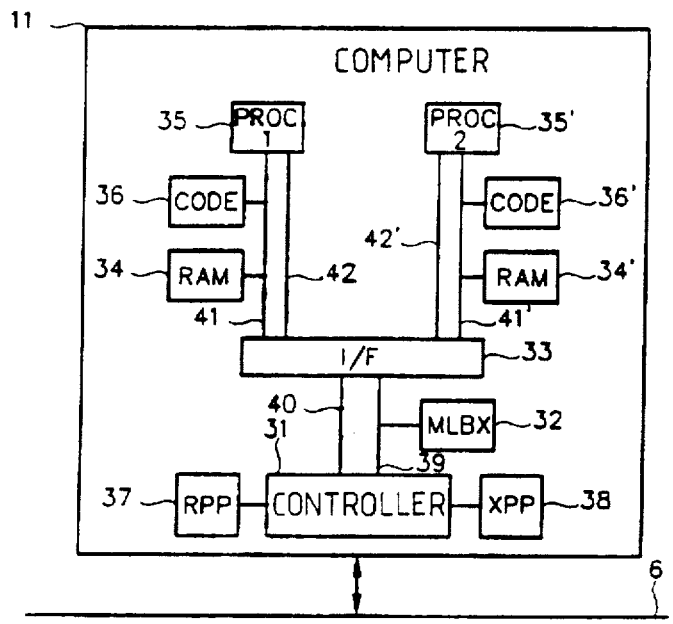
Figure 2:
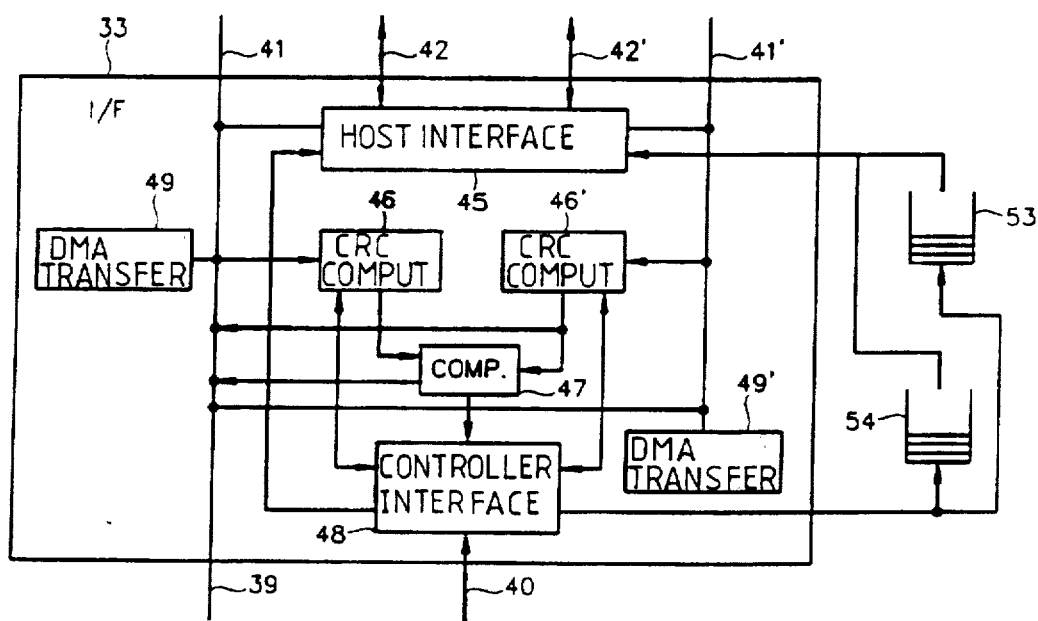
Figure 3:
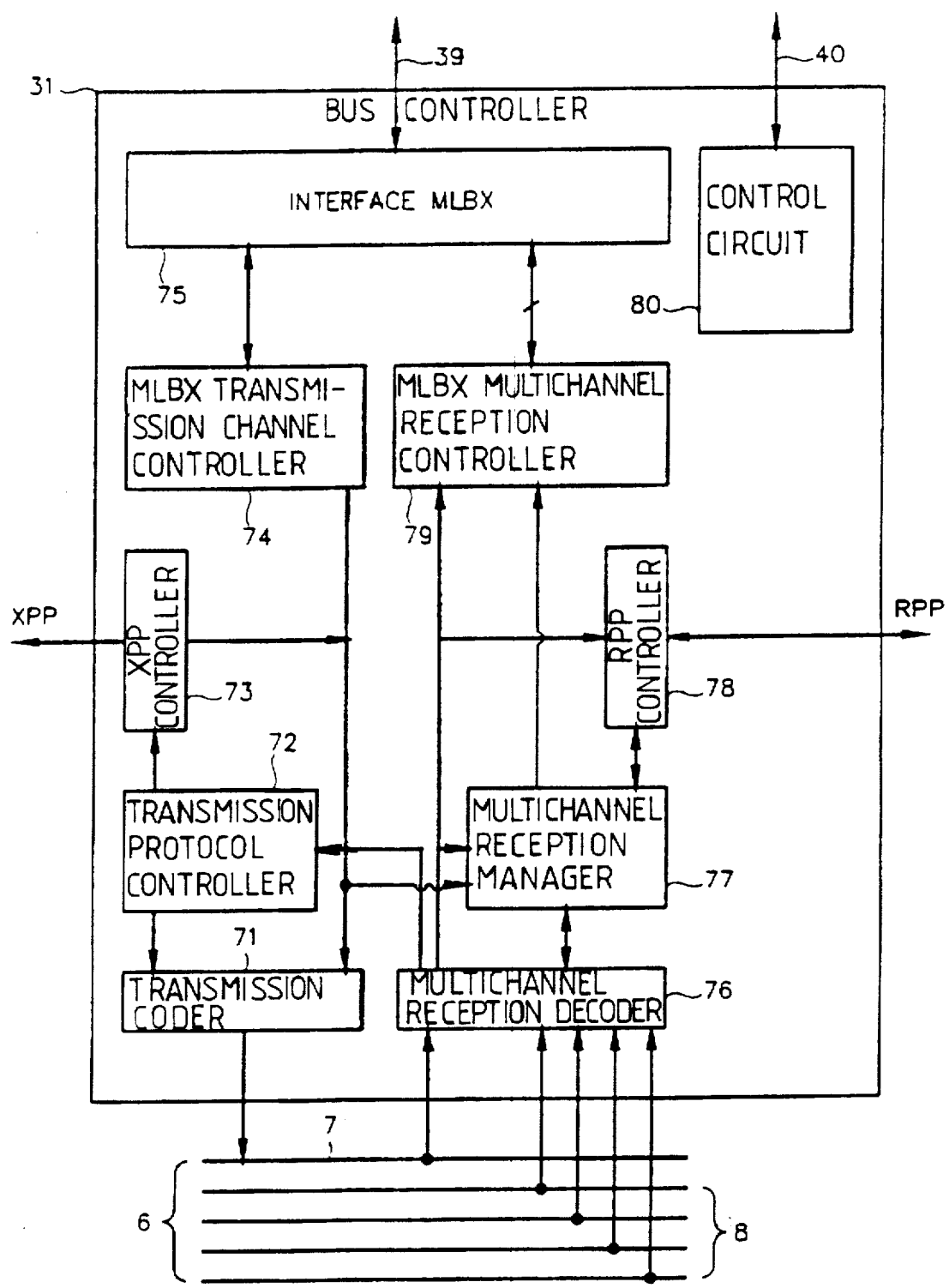
Figure 4:
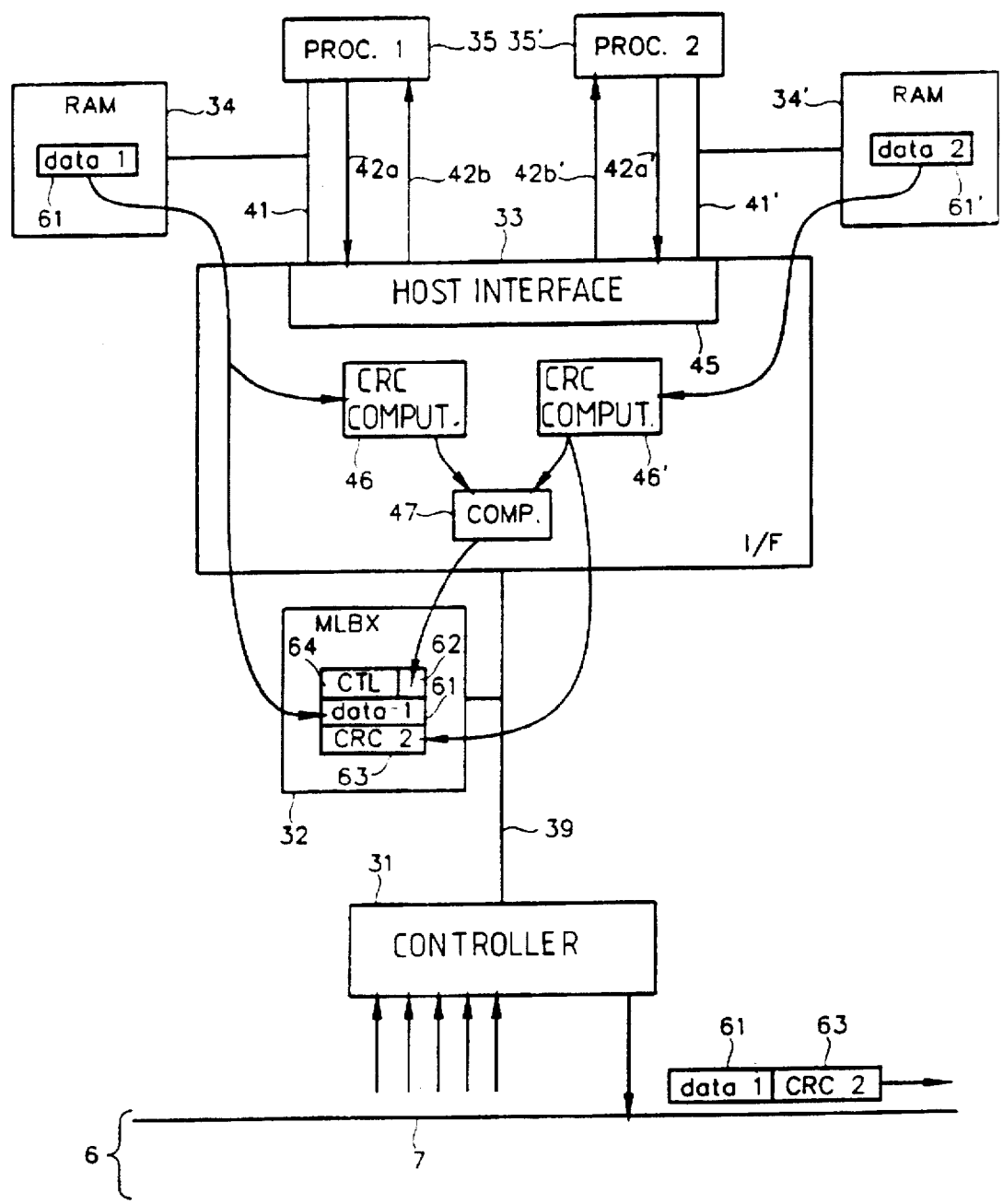
Figure 5:
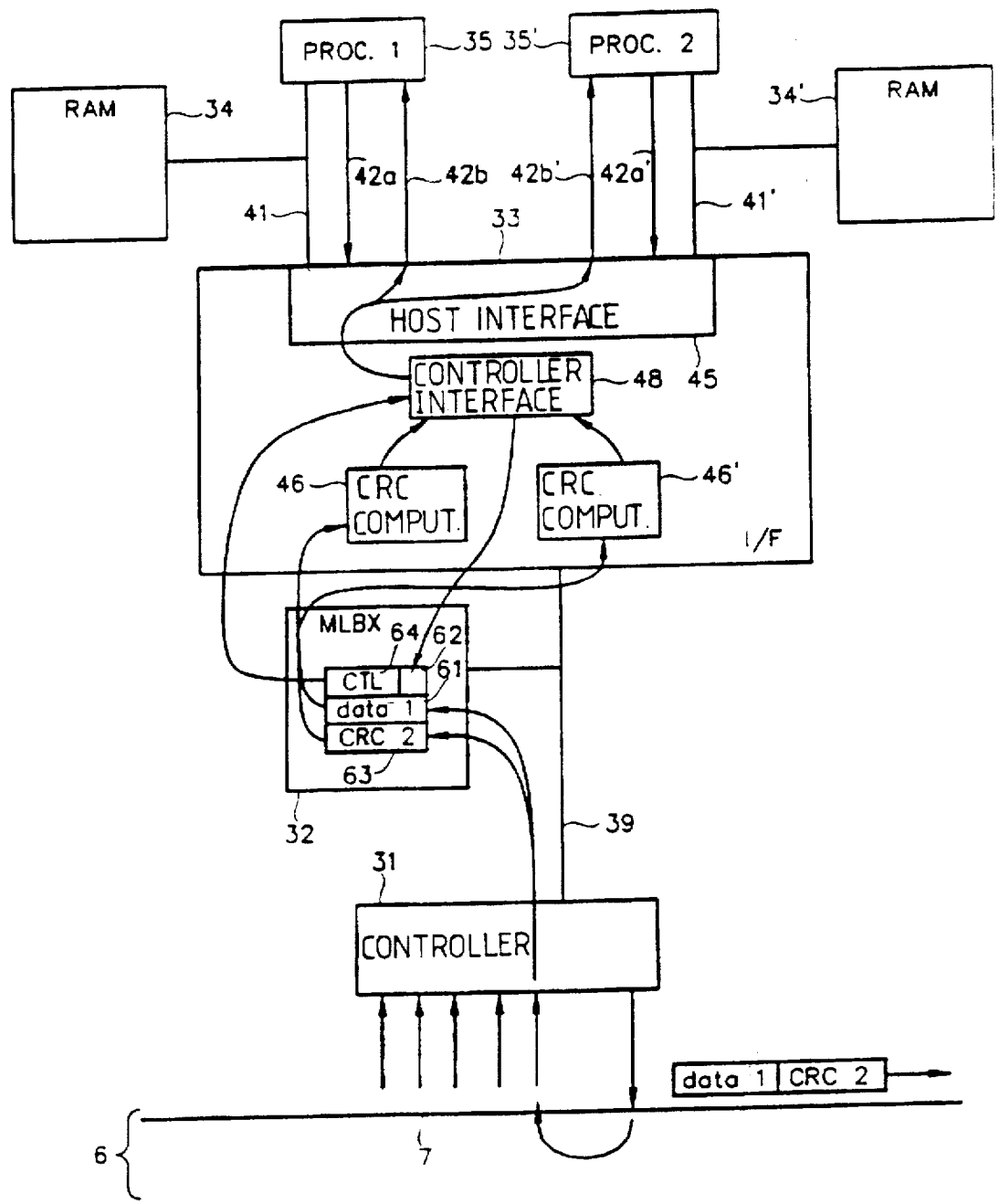
Figure 6:
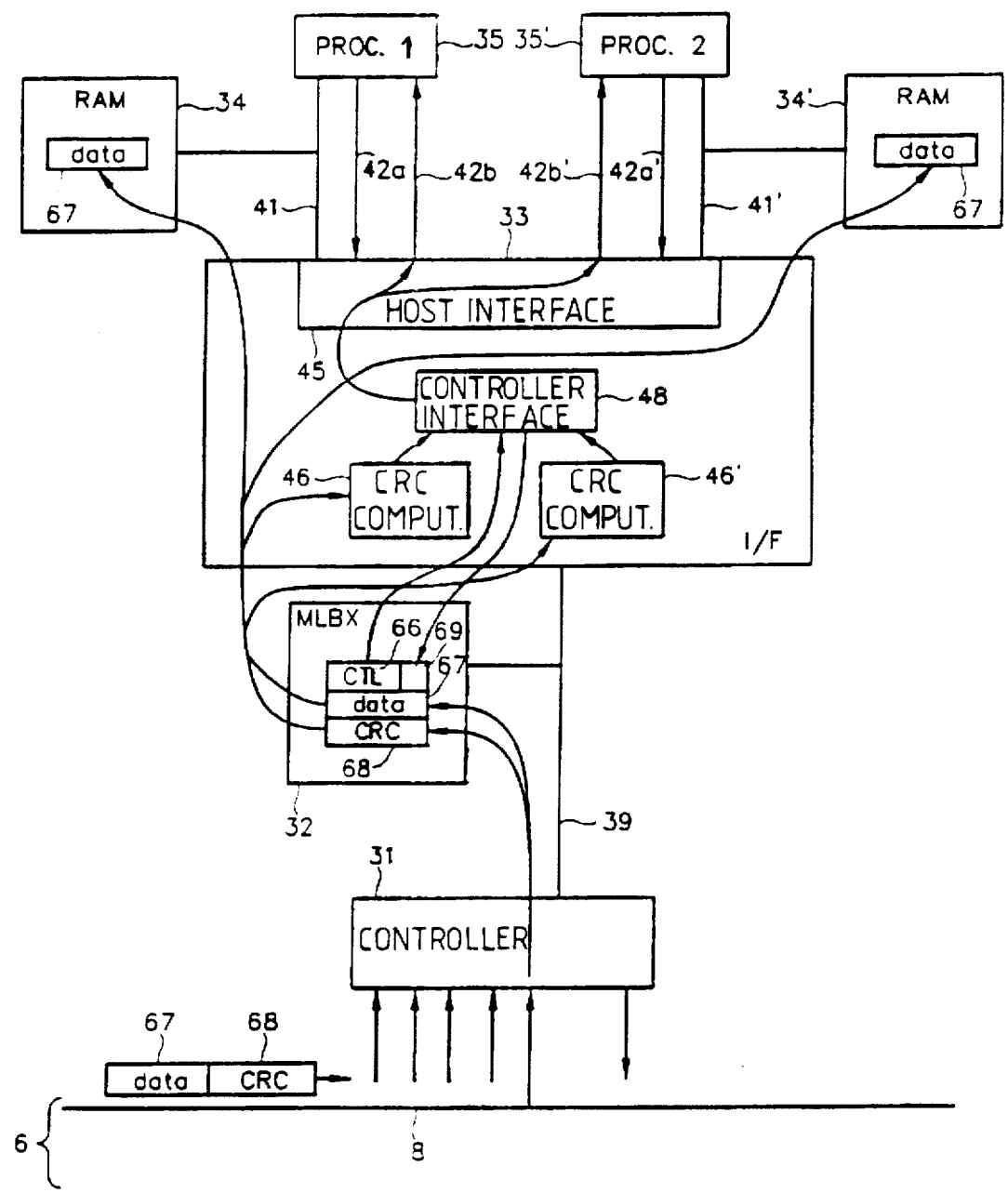

3 invention described, by way of a non-limiting example, in reference to the corresponding accompanying drawings in which:

FIG. 1 schematically represents a computer with two redundant processors using the interfacing device embodying the invention;

FIG. 2 is a block-diagram of the interfacing device;

FIG. 3 illustrates an embodiment of a bus controller;

FIGS. 4 to 6 illustrate the working of the interfacing device.

DESCRIPTION OF THE PREFERRED EMBODIMENTS

FIG. 1 represents a computer 11, such as the computers taken on board an aerodyne. It has a redundant architecture with two processing chains each comprising a processor 35,35' connected by a processor bus 41,41' to a memory 36,36' containing the programme run by the processor, and to a working memory 34,34' containing the data handled by the processor.

The computer 11 also comprises a bus controller 31 which enables it to communicate, via at least one external bus 6, with other electronic systems taken on board the aerodyne.

Furthermore, in order to connect the two processing chains with a common bus controller, the computer 11 comprises an interfacing device 33 connected, on one side, to the processors 35,35' via busses 41,41' and control signal transfer lines 42,42', and, on the other side, to the bus controller 31 by means of an address and data transfer bus 39 and a control bus 40. An exchange memory 32 connected to the bus 39 enables storage of the messages received and to be transmitted by the external bus 6. The interfacing device 33 is e.g. integrated into an ASIC.

In the case of an ARINC 629 type external bus 6, the bus controller 31 is connected to two non-volatile memories 37,38 in which are stored all the data describing the messages to be transmitted or to be received. In particular, these memories contain, for each data block of each message, an identification number referred to as a "label", its size and the address at which it is stored in the exchange memory 32.

According to the ARINC 629 standard, the messages transmitted by such a bus are comprised of a succession of one to 31 blocks called "wordstrings", each block comprising a 20-bit label word identifying the transmitter of the message and the contents of the block, followed by from 0 to 256 20-bit data words. The data associated with a label is not marked at message level but at block level. As a result, all the data transfer services provided by the bus controller 31 concern the blocks and not the messages.

These data blocks are transmitted on a channel of the bus 6 during periodic frames, each terminal connected to the bus being only authorized to transmit a single periodic message during one frame, completed by additional aperiodic data blocks if there is any time left available in the frame.

As represented in FIG. 2, the interfacing device 33 embodying the invention comprises:

a host interfacing circuit 45 connected to the control lines 42,42' and to the busses 41,41' of the two processors 35,35', and which synchronizes the requests transmitted by the two processors 35,35' and transmits, to the processors, status words reporting on transmission and reception, two signature computing circuits 46,46' (e.g. of the checksum or CRC (Cyclic Redundancy Check) type) which compute the signature of the contents of the data blocks

4 to be transmitted or received by the bus controller 31, these computing circuits being respectively assigned to the two processors, a comparator 47 which checks the equality of the signatures elaborated by the two computing circuits 46,46', thus enabling a checking of the consistency of the blocks respectively transmitted by the two processors 35,35', a controller interfacing circuit 48 which notably generates a status word for the last transmission or reception performed by the bus controller, and two DMA (Direct Memory Access) transfer circuits 49,49' which enable memory to memory data transfers to be performed between the working memories 34,34' of the two processors 35,35' and the exchange memory 32.

Furthermore, as the interfacing device 33 is connected by three busses 41,41',39 respectively to the two processors and to the bus controller 31, it operates with three separate clocks, the first two being respectively those of the processors 35,35' and the third being that of the bus controller 31.

The host interfacing circuit 45 notably enables all the transmission or reception requests of the processors 35,35' to be synchronized. To this end, when it receives a first request from a processor, it goes into time-filling standby for an identical request from the other processor. It then compares the first request with all the requests transmitted by the other processor. If the other processor has not transmitted a request strictly identical to the first one within a given period of time, it sends an error signal over the control lines 42,42' to both the processors 35,35' and abandons the first request. Otherwise, it activates processing of the request.

The controller interfacing circuit 48 enables generation of a status report on the last transmission or reception carried out by the processors 35,35'. To this end, it fetches, in the exchange memory 32, the control word associated with the data block transmitted or received, updated by the bus controller 31, and completes it with the result of the comparisons between the signature associated with the data block in the exchange memory and the result of the computations performed by the computing circuits 46,46' on the data block.

The control word managed by the bus controller 31 indicates notably whether the data block has been refreshed since it was last read, and whether format errors have been detected by the bus controller 31 on the data received.

FIG. 3 shows an example of a functional architecture of the bus controller 31 connected to a external bus 6 comprising e.g. a transmission channel 7 and a plurality of reception channels 8, each of these channels being of the ARINC 629 type. Such a bus controller comprises, for the transmission of messages on the channel 7 of the external bus 6:

a transmission coding circuit 71 connected to the transmission channel 7, this circuit performing the formatting, serialization and coding of the data to be transmitted, a transmission protocol checking circuit 72 which manages the decision-making protocol (time format) for the transmission of data on the bus, and the piloting of the spatial format of the messages being transmitted, a circuit 73 controlling the non-volatile transmission memory 38 containing the description of the messages to be transmitted and the address of the latter in the exchange memory 32, this control circuit 73 reading the data describing each of the data blocks of a given message to be transmitted, contained in the non-volatile XPP memory 38, and a circuit 74 controlling the transmissions of the exchange memory 32, which manages the transmissions of an interfacing circuit 75 for the acquisition and monitoring of data to be transmitted, the interfacing circuit 75 managing the different requests for access to the exchange memory 32 via the bus 39.

The controller 31 comprises, for the receiving of data transiting on the reception channels 8 of the bus 6:

- a multichannel reception decoding circuit 76 designed to detect the activity of each channel, deserialize the data received on each of the channels 8, and perform physical and partially logical monitoring channel by channel,
- a multichannel reception management circuit 77 which manages and monitors the label and data words received on each channel, and schedules the processing to be performed to receive the data transmitted by each channel,
- a circuit 78 controlling the non-volatile reception memory 37 containing the description of the data blocks to be received as well as the addresses of the latter in the exchange memory 32, this control circuit 78 reading the data describing a data block received by one channel, said data being contained in the non-volatile reception memory 37, and
- a circuit 79 for controlling the reception of the exchange memory 32, said circuit performing reception management of the interfacing circuit 75 for the supply and monitoring of the data received.

Furthermore, the controller 31 comprises a control circuit 80 which enables an external entity to configure, monitor and control the different devices of the control unit via the control bus 40.

It should be noted that the multichannel reception decoding circuit 76 is also connected to the transmission channel 7 in order to receive the data blocks transmitted by the transmission coding circuit 71. The data to be transmitted used by the transmission coding circuit 71 are also supplied directly to the multichannel reception management circuit 77, in order to enable transmission quality control to be carried out by comparing the data transmitted with the data read simultaneously on the bus.

Such a bus control unit 31 can advantageously be integrated in an ASIC.

FIGS. 4 to 6 illustrate the working of the interfacing device 33, respectively subsequent to transmission requests, transmission check requests and reception requests transmitted by the processors 35,35'.

In FIG. 4, when the host interfacing circuit 45 has received two strictly identical transmission requests over the control lines 42a,42a' from the two processors 35,35', it activates the circuits 49,49' to carry out a DMA transfer of the data block 61,61' designated in the requests, from the working memories 34,34' to the computing circuits 46,46', and from the working memory 34 of the processor 35 to the exchange memory 32 at the address indicated in the transmission requests. At the same time, the computing circuits 46,46' compute the signature on the data to be transmitted, and the signatures thus computed are applied to the input of the comparator 47, the signature 63 computed by the second computing circuit 46' being inscribed in the exchange memory in association with the block 61 to be transmitted.

Thus, the data which will be transmitted on the bus will be comprised of the data block 61 generated by the processor 35, and the signature 63 computed by the computing circuit 46' from the data block 61' generated by the processor 35'. Thus, even in the event of failure of the comparator 47, which would be the only element to no longer detect a variance between the data transmitted by the processors 35,35, and would therefore let a non-valid data block pass, the receiver could detect the error as the signature 63 would not be compatible with the data block 61.

If the signatures computed by the two circuits 46,46' are identical, the comparator 47 validates the transmission by indicating the refreshing by means of a refresh bit 62 in the control word 64 associated with the block to be transmitted 61 to the exchange memory 32. The bus controller 31 looks up this control word 64 when the data block is to be transmitted on the bus, realises that this refresh bit 62 has been positioned, and therefore transmits the data block 61, with which the signature is associated, on the transmission channel 7 of the bus 6. Conversely, if the signatures computed by the two circuits 46, 46' are different, the error is logged by the controller interfacing circuit 48 which generates a status word transmitted to the processors 35,35' by the host interfacing circuit 45 over the control lines 42b,42b'.

According to the ARINC 629 standard, the bus controller 31 listens into the transmission channel 7 in order to receive the message the latter has just transmitted, so as to be able to check that the transmission has been performed correctly. To this end, the bus controller 31 can convey the data block 61 and signature 63 it has received into a reception area of the exchange memory 32, and update the control word 64 indicating the result of a certain number of low-level tests carried out during re-listening to the data block transmitted.

As illustrated in FIG. 5, the interfacing device 33 enables the processors 35,35' to determine the status of a transmission performed by the bus controller 31.

To do so, the two processors must send the interfacing device 33 a transmission check request for a specified data block. When the host interfacing circuit 45 receives two identical transmission check requests respectively from the two processors 35,35', and insofar as the reception refresh bit 62 in the exchange memory 32 is activated, thereby indicating that the data block has been effectively received, it activates the DMA transfer circuits 49,49' to transfer the received data block 61 and signature 63 received from the exchange memory 32 to the computing circuits 46,46' which compute the signature on the data block 61 and compare it with the associated signature 63. The results of the comparisons are transmitted to the controller interfacing circuit 48 which generates a transmission status word from the control word 64 read in the exchange memory 32 and the results of the comparisons. Then, the controller interfacing circuit 48 zeroizes the refresh bit 62 in the exchange memory 32 and transmits the status word thus generated to the processors 35,35' over the control lines 42b,42b' via the host interfacing circuit 45.

In FIG. 6, when the host interfacing circuit 45 receives the two identical reception requests respectively from the two processors 35,35', and insofar as the reception refresh bit 69 of the control word 66 is activated in the exchange memory 32, thereby indicating that the data block has been effectively received, it activates the DMA transfer circuits 49,49' to transfer the received data block 67 from the exchange memory 32 to the working memories 34,34', and the received data block 67 and signature 68 to the signature computing circuits 46,46'. These two circuits then compute the signature on the data block 67, compare the result obtained with the received signature 68, and transmit the result of the comparison to the controller interfacing circuit 48 which will read, in the exchange memory 32, the control word 66 associated with the received data block 67. The controller interfacing circuit 48 then generates a reception status word grouping together the control word 66 and the results of the comparisons, which is then transmitted to the host interfacing circuit 45, and deactivates the refresh bit 69 in the exchange memory 32.

To avoid having to interrupt the applications performed by the processors 35,35', a deferred reception mode has been provided in which the storage areas for the data blocks received are managed on a rotating buffer area basis, thus enabling the reading of the data by the processors 35,35' to be deferred without risking crushing the data.

In deferred reception, the bus controller 31 keeps a reception index up to date in the exchange memory 32, specifying the updated number of data blocks received in the exchange memory 32. At the same time, the two processors 35,35' must keep up to date a reading index corresponding to the number of data blocks read in the exchange memory 32. The variance between these two indexes indicates the number of data blocks remaining to be read, to within one modulo of the size of the rotating buffer area expressed in numbers of blocks. Furthermore, cases of data block crushing are managed by the bus controller 31 by means of the crush bit contained in the control word associated with each data block in the exchange memory 32.

To dump a rotating buffer area, the two processors 35,35' must send the interfacing device 33 a request to read the reception index in the exchange memory 32. When the host interfacing circuit 45 receives two identical requests from the two processors 35,35', it positions on the busses 41,41' the reception index read in the exchange memory 32. Depending on the variance between the indexes managed by the processors 35,35' and the index read in the exchange memory 32, the processors 35,35' will know whether or not there is at least one data block remaining to be read in the exchange memory 32.

Each processor then transmits a reception request associated with a read address in the exchange memory equal to the base address of the buffer area added to the reading index multiplied by the size of a block.

To dump all the buffer areas, the two processors 35,35' must reread the reception index and recommence reception of the data blocks stored in the exchange memory 32. These operations are e.g. performed at the start of each frame.

In addition, to avoid the processors 35,35' having to examine all the buffer areas of the exchange memory 32 at the start of each frame, the interfacing device 33 records, in a FIFO type stack 53, the reporting provided by the control unit 31 on all the labels received, and may associate a reception date therewith. By accessing this stack 53, the processors 35,35' can thus determine which blocks were received during the last frame.

To this end, when the control bus 40 receives a signal indicating that the controller 31 is operating in the deferred reception mode, the controller interfacing circuit 48 activates itself and picks up, on the access bus 39 to the exchange memory 32, the access address in this memory constituting a unique definition of the buffer area.

Again to avoid interrupting the processing performed by the processors 35,35', the interfacing device 33 memorizes the exception and interruption contexts in a second FIFO type stack 54. These exceptions and interruptions are transmitted by the controller 31 and are e.g. of the following types: exception on transmission or reception, exception at bus controller 31 level, exception at access to the memories 37,38 and 32, interruption at the start or end of transmission or reception.

In the event of an exception or interruption, the bus controller 31 sends a signal to the interfacing device 33 with a coding of the type of exception or interruption associated with a channel number. As a function of this information, the controller interfacing circuit 48 read accesses, via the control bus 40, the registers of the controller 31 corresponding to the type of exception or interruption and to the channel number, and memorizes the information obtained in the stack 54, i.e.

the type of exception or interruption and the identification of the error(s), the channel number and value of the label associated with the exception or interruption, and the interruption vector.

To access the stacks 53,54, the two processors 35,35' must send out a stack 53,54 read request addressed to the interfacing device 33 which, subsequent to processing by the host interfacing circuit 45, positions the oldest datum of a stack on the processor busses 41,41'.

These stacks 53,54 are dumped e.g. at the start of each frame.

The host interfacing circuit 45 also enables the two processors 35,35' to be synchronized with the bus controller 31 so as to reduce to a minimum the variance between the moment the data are generated and the moment they are transmitted by the bus controller 31. This mechanism enables the sequencing of the processing to be synchronized with the progress of the frame on the external bus 6.

To this end, the bus controller 31 emits a signal at the start of each frame which reactivates the controller interfacing circuit 48. The controller interfacing circuit 48 can then pick up, from the control bus 40, the address generated by the controller 31 in the non-volatile transmission memory 38, said address corresponding to the address of the descriptors of the next message to be transmitted. A sequencing interruption accompanied by the address of the descriptors of the next message to be transmitted is then sent to the two processors 35,35' which should normally be awaiting this interruption. Should this interruption occur outside of a time window provided for this purpose, this means that a synchronization failure has occurred in one or both of the processors in relation to the controller 31, and a recovery processing must be performed.

We claim:

1. An interfacing device for connecting a computer comprising plural redundant processors, to a bus controller connected to at least one external digital data transfer bus, each processor being connected by a respective internal digital data transfer bus to a respective working memory, said device comprising:

a means for receiving from said processors transmission and reception requests for transferring data blocks between said working memories and said bus controller, each request designating an area in said working memories, a means for synchronizing and comparing the requests received by said receiving means and respectively transmitted by said processors, and for triggering processing of a request when this request has been transmitted by all the processors, processing means for processing transmission requests, said processing means being triggered by said synchronizing means, and comprising a means for comparing data blocks located in the area designated by a processed transmission request in all said working memories, and a means for triggering transfer of said data blocks if they are identical in all said working memories, a first means for transferring the data blocks to be transmitted on said external bus, from a working memory of one of said processors to the bus controller, said first transferring means being triggered by said processing means, and a second means for transferring data blocks received from said bus controller to the area designated by a processed reception request in all said working memories of said processors, said second transferring means being triggered by said synchronizing means.

2. The interfacing device as claimed in claim 1, said device comprising a means for checking integrity of each data block received by said bus controller, and if said data block is integral, for validating transfer thereof towards the respective working memories of the processors.

3. The interfacing device as claimed in claim 1, further comprising a means for computing a signature on each data block transmitted by each processor and each data block received by said bus controller, a means for comparing with one another the respective signatures of the data blocks respectively transmitted by said processors, for adding said signature to each data block to be transmitted, a means for comparing the signature computed on each block received with a signature contained in said block and computed by a transmitter of the block, and means for generating a status word including a result of these comparisons and a check word generated and supplied by the bus controller, said status word being transmitted to all said processors.

4. The interfacing device as claimed in claim 1, said device being connected to an exchange memory intended to receive all the data blocks to be transmitted and received by the controller of the bus.

5. The interfacing device as claimed in claim 1, said device being connected to a FIFO type memory in which are stored all exceptions and interruptions transmitted by the bus controller, this memory being accessible on request transmitted by all the processors to the synchronizing means.

6. The interfacing device as claimed in claim 1, said device being connected to a FIFO type memory in which are stored identification codes of the data blocks received by the bus controller, this memory being accessible on request transmitted by all the processors to the synchronizing means.

7. The interfacing device as claimed in claim 1, wherein the synchronizing synchronizes the processors with the bus controller so as to reduce to a minimum the time between the moment the data are generated by the processors and the moment they are effectively transmitted on the external bus by the bus controller.

8. The interfacing device as claimed in claim 3, wherein the bus controller comprises a means for receiving the data block it has just transmitted on the bus and means for checking that the transmitted data block corresponds to the received data block, the synchronizing means comprising means for processing a transmission check request transmitted by all the processors, and means for triggering said computing means to compute a signature on the data block thus received and to compare said signature with the signature associated with the data block transmitted and reread on the external bus, and stored in the exchange memory, the result of this comparison being transmitted to the means for generating a status word.

9. The interfacing device as claimed in claim 5, wherein the FIFO type memory is updated by a means for generating a status word which has access to registers of the bus controller in which data pertaining to exception or interruption context are stored.

10. The interfacing device as claimed in claim 3, wherein the data blocks are transmitted on the external bus within periodic frames, the generating means being designed to receive and process a signal emitted by the bus controller at the start of each frame.

11. The device as claimed in claim 6, wherein the bus controller comprises a deferred reception mode, and emits a signal when it receives a data block in this mode, said signal being received by a generating means which accesses information relative to the identification of said data block received and the storage address of said block in an exchange memory, this information being manipulated by the bus controller when said data block is received in said deferred reception mode, said generating means inscribing these data in said FIFO type memory.

12. The device as claimed in claim 1, integrated in an ASIC.

13. A computer connected via a bus controller to at least one external digital data transfer bus, said computer comprising plural redundant processors each being connected by a respective internal digital data transfer bus to a respective working memory and to an interfacing device connected to said bus controller, said interfacing device comprising:

a means for receiving from said processors transmission and reception requests for transferring data blocks between said working memories and said bus controller, each request designating an area in said working memories, a means for synchronizing and comparing the requests received by said receiving means and respectively transmitted by said processors, and for triggering processing of a request when this request has been transmitted by all the processors, processing means for processing transmission requests, said processing means being triggered by said synchronizing means, and comprising a means for comparing data blocks located in the area designated by a processed transmission request in all said working memories, and a means for triggering transfer of said data blocks if they are identical in all said working memories, a first means for transferring the data blocks to be transmitted on said external bus, from a working memory of one of said processors to the bus controller, said first transferring means being triggered by said processing means, a second means for transferring data blocks received from said bus controller to the area designated by a processed reception request in all said working memories of said processors, said second transferring means being triggered by said synchronizing means, a means for computing a signature on each data block transmitted by each processor and each data block received by said bus controller, a means for comparing with one another the respective signatures of the data blocks respectively transmitted by said processors, and for adding said signature to each data block to be transmitted, a means for comparing the signature computed on each block received with a signature contained in said block, and means for generating a status word including a result of these comparisons and a check word generated and supplied by the bus controller, said status word being transmitted to all said processors.

14. A computer connected via a bus controller to at least one external digital data transfer bus, said computer comprising plural redundant processors each being connected by a respective internal digital data transfer bus to a respective working memory and to an interfacing device connected to said bus controller, said interfacing device comprising:

- a means for receiving from said processors transmission and reception requests for transferring data blocks between said working memories and said bus controller, each request designating an area in said working memories,
- a means for synchronizing and comparing the requests received by said receiving means and respectively transmitted by said processors, and for triggering processing of a request when this request has been transmitted by all the processors,
- processing means for processing transmission requests, said processing means being triggered by said synchronizing means, and comprising a means for comparing data blocks located in the area designated by a processed transmission request in all said working memories, and a means for triggering transfer of said data blocks if they are identical in all said working memories,
- a first means for transferring the data blocks to be transmitted on said external bus, from a working memory of one of said processors to the bus controller, said first transferring means being triggered by said processing means, and
- a second means for transferring data blocks received from said bus controller to the area designated by a processed reception request in all said working memories of said processors, said second transferring means being triggered by said synchronizing means,
- said computer further comprising a FIFO type memory connected to said interfacing device for storing all the exceptions and interruptions transmitted by the bus controller, this memory being accessible on request transmitted by all the processors to the synchronizing means.

* * * * *